United States Patent
Yamazaki

(10) Patent No.: US 10,264,466 B2
(45) Date of Patent: Apr. 16, 2019

(54) USER TERMINAL, PROCESSOR, AND MOBILE COMMUNICATION SYSTEM

(71) Applicant: KYOCERA CORPORATION, Kyoto (JP)

(72) Inventor: Chiharu Yamazaki, Tokyo (JP)

(73) Assignee: KYOCERA Corporation, Kyoto (JP)

(*) Notice: Subject to any disclaimer, the term of this patent is extended or adjusted under 35 U.S.C. 154(b) by 0 days.

(21) Appl. No.: 15/668,972

(22) Filed: Aug. 4, 2017

(65) Prior Publication Data

US 2017/0359733 A1  Dec. 14, 2017

Related U.S. Application Data

(63) Continuation of application No. PCT/JP2016/053890, filed on Feb. 10, 2016.

(60) Provisional application No. 62/114,154, filed on Feb. 10, 2015.

(51) Int. Cl.
*H04B 17/345* (2015.01)
*H04W 16/14* (2009.01)
*H04B 17/15* (2015.01)

(52) U.S. Cl.
CPC .......... *H04W 16/14* (2013.01); *H04B 17/15* (2015.01); *H04B 17/345* (2015.01)

(58) Field of Classification Search
None
See application file for complete search history.

(56) References Cited

U.S. PATENT DOCUMENTS

| | | |
|---|---|---|
| 2011/0200137 A1 | 8/2011 | Han et al. |
| 2013/0003668 A1 | 1/2013 | Xiao et al. |
| 2015/0131536 A1 | 5/2015 | Kaur et al. |
| 2015/0172950 A1* | 6/2015 | Chen ............... H04W 16/14 370/252 |
| 2015/0289141 A1* | 10/2015 | Ghasemzadeh ....... H04W 16/14 370/330 |

(Continued)

FOREIGN PATENT DOCUMENTS

| | | |
|---|---|---|
| JP | 2014-500685 A | 1/2014 |
| JP | 2014-517576 A | 7/2014 |
| WO | 2016/017328 A1 | 2/2016 |

OTHER PUBLICATIONS

JP Office Action dated Sep. 12, 2017, from corresponding JP Appl No. 2016-574822, with English statement of relevance, 4 pp.

(Continued)

*Primary Examiner* — Ajit Patel
(74) *Attorney, Agent, or Firm* — Studebaker & Brackett PC

(57) ABSTRACT

A user terminal according an embodiment, comprises: a controller configured to execute measurement based on a radio signal in a secondary cell in an unlicensed band; and a transmitter configured to transmit, to a base station, a report of measurement results based on the radio signal. The controller is configured to determine whether or not identification information to which a predetermined scramble is applied is detected from a predetermined radio signal in the secondary cell. The transmitter is configured to transmit, to the base station, the report of measurement results not including a predetermined measurement result based on the predetermined radio signal, in response to no detection of the identification information from the predetermined radio signal.

4 Claims, 9 Drawing Sheets

(56) References Cited

U.S. PATENT DOCUMENTS

2017/0013468 A1* 1/2017 Zhu ..................... H04W 16/14

OTHER PUBLICATIONS

International Search Report issued in PCT/JP2016/053890; dated May 10, 2016.
3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2; 3GPP TS 36.300 V12.4.0; Dec. 2014; pp. 1-251; Release 12; 3GPP Organizational Partners.
NTT DOCOMO; Views on PHY layer options for LAA DL; 3GPP TSG RAN WG1 Meeting #79; R1-145107; Nov. 17-21, 2014; pp. 1-7; San Francisco, USA.
ETRI; Scenarios and Requirements for LAA; 3GPP TSG RAN WG2 #89; R2-150234; Feb. 9-13, 2015; pp. 1-6; Athens, Greece.

* cited by examiner

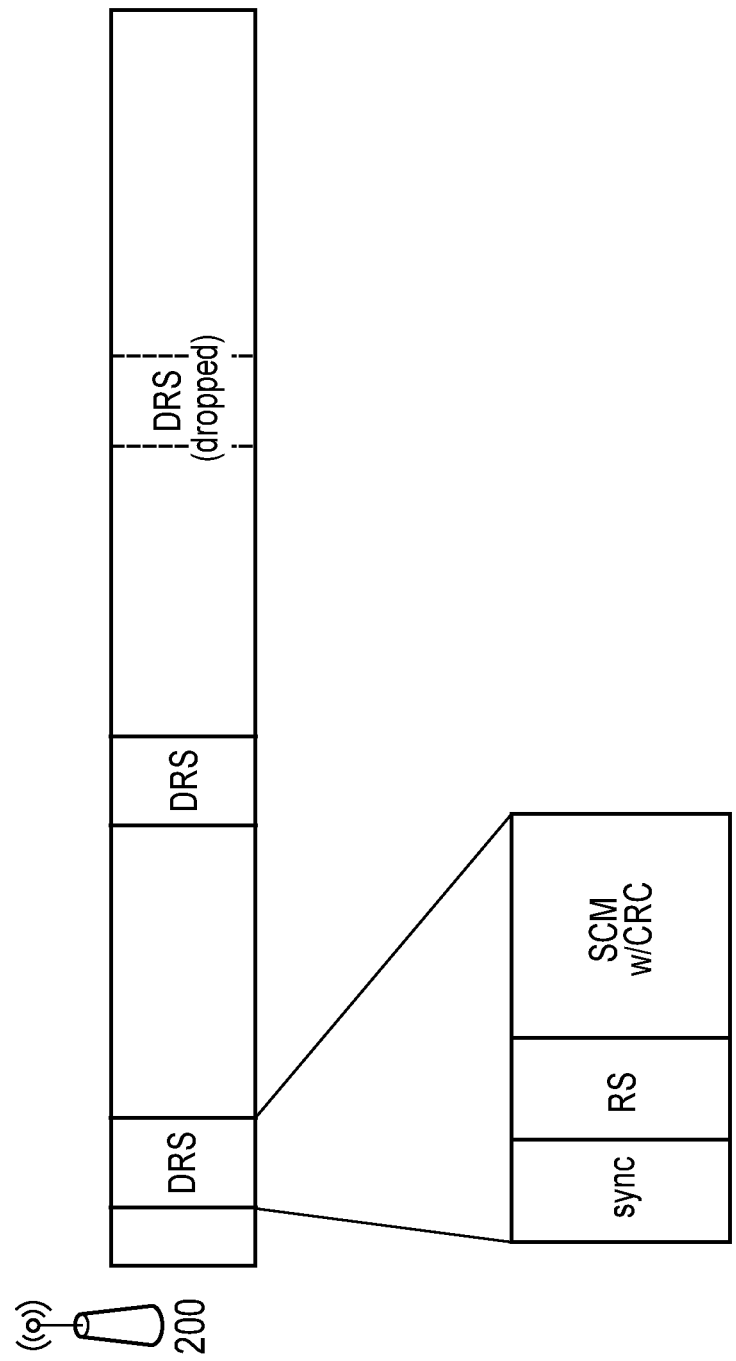

USER TERMINAL, PROCESSOR, AND MOBILE COMMUNICATION SYSTEM

RELATED APPLICATIONS

This application is a continuation application of international application PCT/JP2016/053890, filed Feb. 10, 2016, which claims benefit of U.S. Provisional Application No. 62/114,154, filed Feb. 10, 2015, the entirety of all applications hereby expressly incorporated by reference.

TECHNICAL FIELD

The present application relates to a user terminal, a processor, and a mobile communication system.

BACKGROUND ART

In 3GPP (3rd Generation Partnership Project), which is a project aiming to standardize a mobile communication system, specifications are being designed to enhance LTE (Long Term Evolution) in order to comply with the rapidly increasing traffic demands.

Further, in order to respond to a rapidly increasing traffic demand, focus is now paid not only to communication using a frequency band in which a license is required (licensed band) but also to communication using a frequency band in which no license is required (unlicensed band/unlicensed spectrum).

Here, according to a law (for example, Wireless Telegraphy Act in Japan), if a radio signal is transmitted by using the unlicensed band, then it is required to execute a CCA (Clear Channel Assessment) before the radio signal is transmitted. Specifically, a base station measures interference power in the unlicensed band. If the measurement result is good (specifically, if the interference power is low), it is possible to transmit a radio signal in the unlicensed band.

SUMMARY

A user terminal according an embodiment, comprises: a controller configured to execute measurement based on a radio signal in a secondary cell in an unlicensed band; and a transmitter configured to transmit, to a base station, a report of measurement results based on the radio signal. The controller is configured to determine whether or not identification information to which a predetermined scramble is applied is detected from a predetermined radio signal in the secondary cell. The transmitter is configured to transmit, to the base station, the report of measurement results not including a predetermined measurement result based on the predetermined radio signal, in response to no detection of the identification information from the predetermined radio signal.

A processor according an embodiment comprises: a memory communicatively coupled to the processor and including instructions, such that when executed by the processor performs the processes of: executing measurement based on a radio signal in a secondary cell in an unlicensed band; transmitting, to a base station, a report of measurement results based on the radio signal; determining whether or not identification information to which a predetermined scramble is applied is detected from a predetermined radio signal in the secondary cell; and transmitting, to the base station, the report of measurement results not including a predetermined measurement result based on the predetermined radio signal, in response to no detection of the identification information from the predetermined radio signal.

A mobile communication system according an embodiment comprises: a base station; and a user terminal. The base station transmits a radio signal in a secondary cell in an unlicensed band. The user terminal executes measurement based on the radio signal in the secondary cell in the unlicensed band. The user terminal transmits, to the base station, a report of measurement results based on the radio signal. The base station receives the report of measurement results from the user terminal. The user terminal determines whether or not identification information to which a predetermined scramble is applied is detected from a predetermined radio signal in the secondary cell. The user terminal transmits, to the base station, the report of measurement results not including a predetermined measurement result based on the predetermined radio signal, in response to no detection of the identification information from the predetermined radio signal.

BRIEF DESCRIPTION OF THE DRAWINGS

FIG. 11 is a diagram for describing an operation according to a fifth embodiment.

DESCRIPTION OF THE EMBODIMENT

Overview of Embodiment

Figure 1:
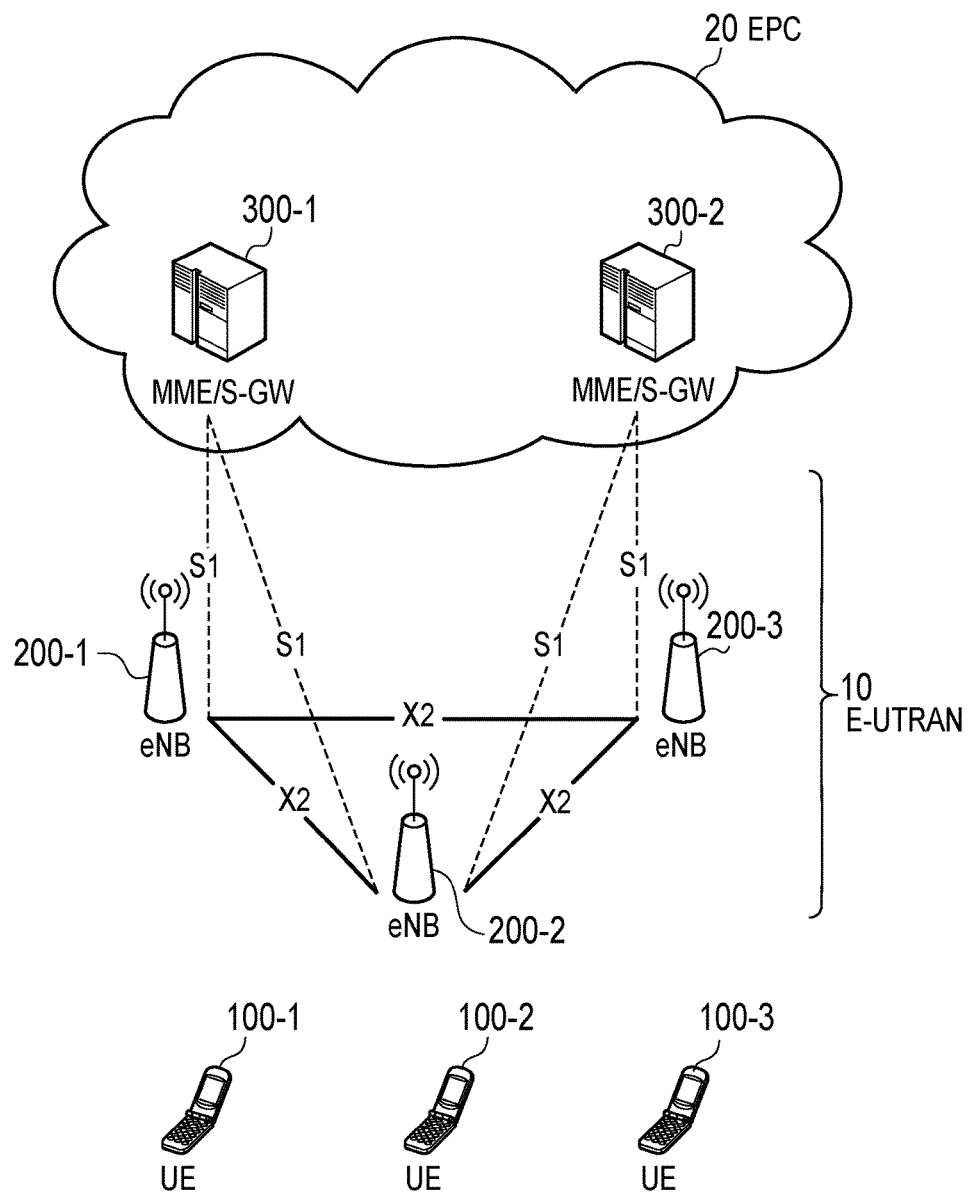
FIG. 1 is a configuration diagram of an LTE system according to each embodiment.

Here, it is assumed that a user terminal performs measurement on a reference signal transmitted from a base station in an unlicensed band. When the user terminal reports the measurement result to the base station, the base station can determine availability of communication with the user terminal or measure a communication quality, in the unlicensed band.

However, if the measurement result of interference power is poor, the base station can not transmit the reference signal. For this reason, even if the user terminal knows a scheduled transmission timing of the reference signal, the user terminal can not determine whether the reference signal was not transmitted or the reference signal could not be received due to the interference although the reference signal was transmitted. As a result, an appropriate measurement result on the reference signal may not be obtained.

A user terminal according an embodiment, comprises: a controller configured to execute measurement based on a radio signal in a secondary cell in an unlicensed band; and a transmitter configured to transmit, to a base station, a report of measurement results based on the radio signal. The controller is configured to determine whether or not identification information to which a predetermined scramble is applied is detected from a predetermined radio signal in the secondary cell. The transmitter is configured to transmit, to the base station, the report of measurement results not including a predetermined measurement result based on the predetermined radio signal, in response to no detection of the identification information from the predetermined radio signal.

The identification information may be information imparted with a CRC (Cyclic Redundancy Check) code.

The transmitter may be configured to transmit, to the base station, the report of measurement results including the predetermined measurement result, in response to a detection of the identification information from the predetermined radio signal.

A processor comprises: a memory communicatively coupled to the processor and including instructions, such that when executed by the processor performs the processes of: executing measurement based on a radio signal in a secondary cell in an unlicensed band; transmitting, to a base station, a report of measurement results based on the radio signal; determining whether or not identification information to which a predetermined scramble is applied is detected from a predetermined radio signal in the secondary cell; and transmitting, to the base station, the report of measurement results not including a predetermined measurement result based on the predetermined radio signal, in response to no detection of the identification information from the predetermined radio signal.

A mobile communication system comprises: a base station; and a user terminal. The base station transmits a radio signal in a secondary cell in an unlicensed band. The user terminal executes measurement based on the radio signal in the secondary cell in the unlicensed band. The user terminal transmits, to the base station, a report of measurement results based on the radio signal. The base station receives the report of measurement results from the user terminal. The user terminal determines whether or not identification information to which a predetermined scramble is applied is detected from a predetermined radio signal in the secondary cell. The user terminal transmits, to the base station, the report of measurement results not including a predetermined measurement result based on the predetermined radio signal, in response to no detection of the identification information from the predetermined radio signal.

A user terminal according to a fifth embodiment comprises: a controller configured to execute measurement by using a predetermined radio signal in a secondary cell in an unlicensed band. The controller excludes, if identification information is not detected from the predetermined radio signal, the predetermined radio signal from measurements to be reported.

The identification information may be scrambled information.

The identification information is information imparted with a CRC (Cyclic Redundancy Check) code.

A user terminal according to a fifth embodiment comprises: a controller configured to execute a control of receiving a predetermined radio signal in a secondary cell in an unlicensed band. The controller determines, based on whether or not identification information is not detected from the predetermined radio signal, whether or not the predetermined radio signal is a reference signal.

The reference signal may be used for measuring a channel state.

The controller may perform measurement on a radio signal in the unlicensed band. The controller may report a measurement result for the radio signal to the base station. The controller may exclude, based on whether or not the identification information is detected from the predetermined radio signal, the measurement result for the predetermined radio signal from the report of measurement results.

The identification information is information based on an identifier associated with the base station. The controller includes, if the identification information is detected from the predetermined radio signal, a measurement result for the predetermined radio signal into the report of measurement results.

The user terminal according to a fifth embodiment may further comprise: a receiver configured to receive, in a licensed band, information included in the reference signal, from the base station. The controller may include, if the information included in the reference signal received from the base station corresponds to the identification information detected from the predetermined radio signal, a measurement result for the predetermined radio signal into the report of measurement results.

The identification information may be imparted with an error detection code. The controller may include, based on the error detection code, if an error is not detected from the identification information, a measurement result for the predetermined radio signal into the report of measurement results.

A base station according to a fifth and a sixth embodiments comprises: a controller configured to transmit, in a secondary cell in an unlicensed band, to a user terminal a predetermined radio signal including identification information. The identification information is used by the user terminal to determine whether or not the predetermined radio signal is a reference signal.

A user terminal according to a sixth embodiment comprises: a controller configured to perform measurement on a reference signal transmitted, in an unlicensed band, from a base station, and report a measurement result for the reference signal. In the reference signal, a predetermined message is stored in a field different from a field storing therein synchronization information used for synchronization with the base station. The controller reports the measurement result by associating the predetermined message with the measurement result.

A base station according to a sixth embodiment comprises: a controller configured to measure interference power in an unlicensed band; a transmitter configured to transmit, based on a measurement result of the interference power, a reference signal in the unlicensed band; and a receiver configured to receive from a user terminal a report on the measurement result for the reference signal. In the reference signal, a predetermined message is stored in a field different from a field storing therein synchronization information used by the user terminal to synchronize with the base station. The controller excludes, if the measurement result received from the user terminal is not associated with the predetermined message included in the reference signal, the measurement result.

First Embodiment

Hereinafter, a description will be provided for an embodiment in a case where a disclosure of the present application is applied to an LTE system.

(System Configuration)

FIG. 1 is a configuration diagram of an LTE system according to an embodiment. As illustrated in FIG. 1, the LTE system according to the embodiment comprises UEs (User Equipment) 100, E-UTRAN (Evolved-Universal Terrestrial Radio Access Network) 10, and EPC (Evolved Packet Core) 20.

The UE 100 corresponds to a user terminal. The UE 100 is a mobile communication device and performs radio communication with a connecting cell (serving cell). A configuration of the UE 100 will be described below in detail.

The E-UTRAN 10 corresponds to a radio access network. The E-UTRAN 10 comprises eNBs 200 (evolved Node-B). The eNB 200 corresponds to a base station. The eNBs 200 are connected to one another via an X2 interface. A configuration of the eNB 200 will be described below in detail.

Each eNB 200 manages one or a plurality of cells and performs radio communication with the UE 100 which establishes a connection with the cell of the eNB 200. The eNB 200, for example, has a radio resource management (RRM) function, a routing function of user data, and a measurement control function for mobility control and scheduling. The "cell" is used as a term indicating a minimum unit of a radio communication area, and is also used as a term indicating a function of performing radio communication with the UE 100.

The EPC 20 corresponds to a core network. The E-UTRAN 10 and the EPC 20 configure a network of the LTE system (LTE network). The EPC 20 comprises a plurality of MME (Mobility Management Entity)/S-GWs (Serving-Gateway) 300. The EPC 20 may comprise an OAM (Operation and Maintenance).

The MME performs various mobility controls and the like for the UE 100. The S-GW performs transfer control of user data. The MME/S-GW 300 is connected to the eNBs 200 via an S1 interface.

The OAM 400 is a server device managed by an operator and performs maintenance and monitoring of the E-UTRAN 10.

Figure 2:
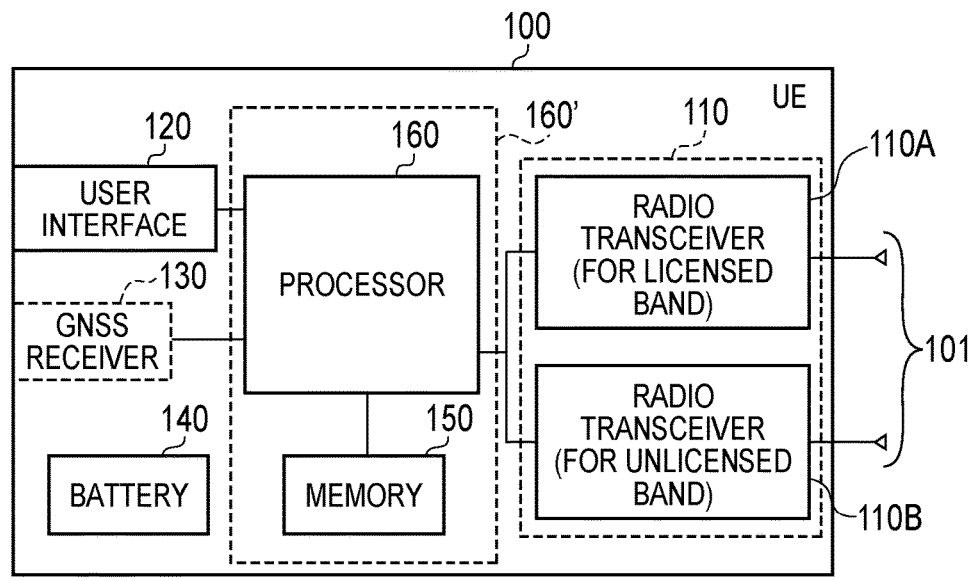
FIG. 2 is a block diagram of a UE according to each embodiment.

FIG. 2 is a block diagram of the UE 100. As illustrated in FIG. 2, the UE 100 includes antennas 101, a radio transceiver 110, a user interface 120, a GNSS (Global Navigation Satellite System) receiver 130, a battery 140, a memory 150, and a processor 160. The UE 100 may not have the GNSS receiver 130. Furthermore, the memory 150 may be integrally formed with the processor 160, and this set (that is, a chip set) may be called a processor 160' constituting a controller.

The antennas 101 and the radio transceiver 110 are used to transmit and receive a radio signal. The radio transceiver 110 converts a baseband signal (transmission signal) output from the processor 160 into the radio signal, and transmits the radio signal from the antennas 101. Furthermore, the radio transceiver 110 converts the radio signal received by the antennas 101 into the baseband signal (reception signal), and outputs the baseband signal to the processor 160.

The radio transceiver 110 comprises a radio transceiver 110A and a radio transceiver 110B. The radio transceiver 110A transmits and receives radio signals in a licensed band, and the radio transceiver 110B transmits and receives radio signals in an unlicensed band.

The user interface 120 is an interface with a user carrying the UE 100, and includes, for example, a display, a microphone, a speaker, and various buttons. The user interface 120 receives an operation from a user and outputs a signal indicating the content of the operation to the processor 160.

The GNSS receiver 130 receives a GNSS signal in order to obtain location information indicating a geographical location of the UE 100, and outputs the received signal to the processor 160. The battery 140 accumulates a power to be supplied to each block of the UE 100.

The memory 150 stores a program to be executed by the processor 160 and information to be used for a process by the processor 160. The processor 160 includes a baseband processor that performs modulation and demodulation, encoding and decoding and the like on the baseband signal, and a CPU (Central Processing Unit) that performs various processes by executing the program stored in the memory 150. The processor 160 may further include a codec that performs encoding and decoding on sound and video signals. The processor 160 corresponds to a controller and executes various processes and various communication protocols, which will be described later.

Figure 3:
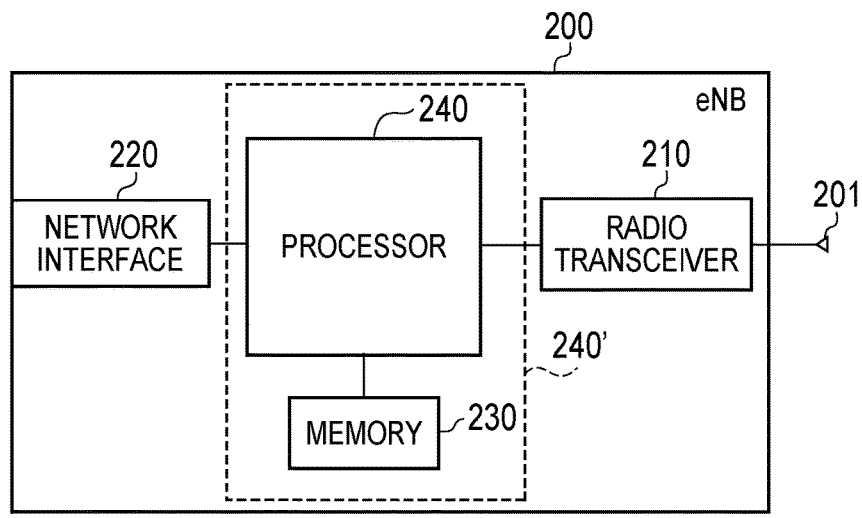
FIG. 3 is a block diagram of an eNB 200 according to each embodiment.

FIG. 3 is a block diagram of the eNB 200. As illustrated in FIG. 3, the eNB 200 includes antennas 201, a radio transceiver 210, a network interface 220, a memory 230, and a processor 240. Furthermore, the memory 230 may be integrally formed with the processor 240, and this set (that is, a chip set) may be called a processor 240' constituting a controller.

The antennas 201 and the radio transceiver 210 are used to transmit and receive a radio signal. The radio transceiver 210 transmits and receives radio signals in a licensed band. The radio transceiver 210 transmits and receives radio signals in a licensed band. Alternatively, the radio transceiver 210 can transmit and receive radio signals in an unlicensed band as well as the licensed band. The radio transceiver 210 converts a baseband signal (transmission signal) output from the processor 240 into the radio signal, and transmits the radio signal from the antennas 201. Furthermore, the radio transceiver 210 converts the radio signal received by the antennas 201 into the baseband signal (reception signal), and outputs the baseband signal to the processor 240.

The network interface 220 is connected to the neighboring eNB 200 via the X2 interface and is connected to the MME/S-GW 300 via the S1 interface. The network interface 220 is used in communication performed on the X2 interface and communication performed on the S1 interface.

The memory 230 stores a program to be executed by the processor 240 and information to be used for a process by the processor 240. The processor 240 includes the baseband processor that performs modulation and demodulation, encoding and decoding and the like on the baseband signal and a CPU that performs various processes by executing the program stored in the memory 230. The processor 240 corresponds to a controller and executes various processes and various communication protocols, which will be described later.

Figure 4:
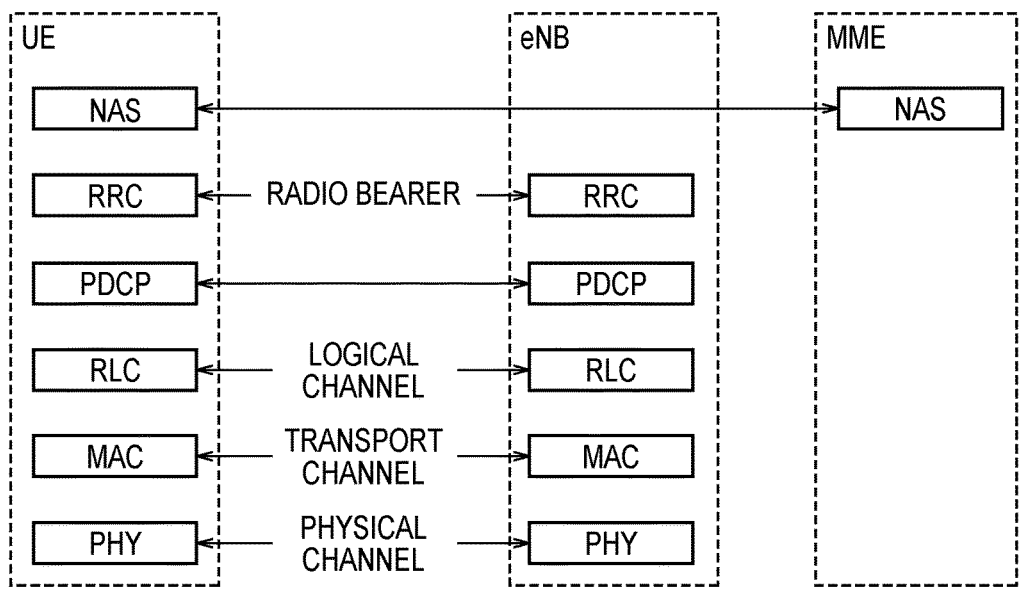
FIG. 4 is a protocol stack diagram according to each embodiment.

FIG. 4 is a protocol stack diagram of a radio interface in the LTE system. As illustrated in FIG. 4, the radio interface protocol is classified into a layer 1 to a layer 3 of an OSI reference model, wherein the layer 1 is a physical (PHY) layer. The layer 2 includes an MAC (Medium Access Control) layer, an RLC (Radio Link Control) layer, and a PDCP (Packet Data Convergence Protocol) layer. The layer 3 includes an RRC (Radio Resource Control) layer.

The PHY layer performs encoding and decoding, modulation and demodulation, antenna mapping and demapping, and resource mapping and demapping. Between the PHY layer of the UE 100 and the PHY layer of the eNB 200, user data and control signal are transmitted via the physical channel.

The MAC layer performs priority control of data, and a retransmission process and the like by hybrid ARQ (HARQ). Between the MAC layer of the UE 100 and the MAC layer of the eNB 200, user data and control signal are transmitted via a transport channel. The MAC layer of the eNB 200 includes a scheduler to determine (schedule) a transport format of an uplink and a downlink (a transport block size and a modulation and coding scheme) and a resource block to be assigned to the UE 100.

The RLC layer transmits data to an RLC layer of a reception side by using the functions of the MAC layer and the PHY layer. Between the RLC layer of the UE 100 and the RLC layer of the eNB 200, user data and control signal are transmitted via a logical channel.

The PDCP layer performs header compression and decompression, and encryption and decryption.

The RRC layer is defined only in a control plane dealing with a control signal. Between the RRC layer of the UE 100 and the RRC layer of the eNB 200, a control signal (an RRC message) for various types of setting is transmitted. The RRC layer controls the logical channel, the transport channel, and the physical channel in response to establishment, re-establishment, and release of a radio bearer. When there is an connection (RRC connection) between the RRC of the UE 100 and the RRC of the eNB 200, the UE 100 is in an RRC connected state, and when there is no connection (no RRC connection), the UE 100 is in an RRC idle state.

An NAS (Non-Access Stratum) layer positioned above the RRC layer performs session management, mobility management and the like.

Figure 5:
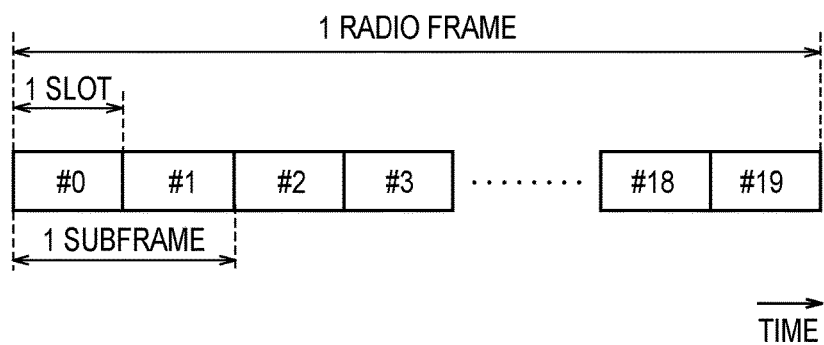
FIG. 5 is a configuration diagram of a radio frame according to each embodiment.

FIG. 5 is a configuration diagram of a radio frame used in the LTE system. In the LTE system, OFDMA (Orthogonal Frequency Division Multiplexing Access) is applied to a downlink (DL), and SC-FDMA (Single Carrier Frequency Division Multiple Access) is applied to an uplink (UL), respectively.

As illustrated in FIG. 5, the radio frame is configured by 10 subframes arranged in a time direction. Each subframe is configured by two slots arranged in the time direction. Each subframe has a length of 1 ms and each slot has a length of 0.5 ms. Each subframe includes a plurality of resource blocks (RB) in a frequency direction, and a plurality of symbols in the time direction. Each resource block includes a plurality of subcarriers in the frequency direction. A radio resource element is configured by one subcarrier and one symbol and one subcarrier. Among radio resources allocated to the UE 100, a frequency resource can be configured by a resource block and a time resource can be configured by a subframe (or slot).

(Communication Utilizing Unlicensed Band)

Communication in which the unlicensed band is utilized according to the present embodiment will be described, below.

The UE 100 can perform communication by using not only a licensed band (licensed spectrum) in which a cellular network operator is granted with a license but also an unlicensed band (unlicensed spectrum) available without a license.

Specifically, firstly, the UE 100 can perform communication by utilizing the unlicensed band by carrier aggregation (CA).

In the CA, in order to realize an enhanced broadband while ensuring a backward compatibility with LTE, a carrier (frequency band) in the LTE is regarded as a component carrier, and the UE 100 performs communication by simultaneously using a plurality of component carriers (a plurality of serving cells). In the CA, a cell providing predetermined information when a UE starts an RRC connection is referred to as a primary cell (PCell). For example, the primary cell provides NAS mobility information (for example, TAI) at the time of RRC connection establishment/re-establishment/handover and provides security information at the time of the RRC connection re-establishment/handover. On the other hand, a supplementary serving cell forming a pair with the primary cell is referred to as a secondary cell (SCell). The secondary cell is formed together with the primary cell.

If the CA is utilized in communication in which the unlicensed band is utilized, then there may be a case where a predetermined frequency (carrier) in the unlicensed band is utilized as the secondary cell. Hereinafter, if the predetermined frequency is utilized as the secondary cell, the secondary cell is referred to as a U-SCell.

Secondly, the UE 100 can perform communication by utilizing the unlicensed band by a dual connectivity (DC).

In the DC, the UE 100 is allocated with a radio resource from a plurality of eNBs 200. The DC may be referred to as an inter-eNB carrier aggregation (inter-eNB CA).

In the DC, out of a plurality of eNBs 200 establishing connection with the UE 100, only a master eNB (MeNB) establishes an RRC connection with the UE 100. On the other hand, out of the plurality of eNBs 200, a secondary eNB (SeNB) provides an additional radio resource to the UE 100 without establishing the RRC connection with the UE 100. An Xn interface is set between the MeNB and the SeNB. The Xn interface is either an X2 interface or a new interface.

In the DC, the UE 100 can perform carrier aggregation in which N cells managed by the MeNB and M cells managed by the SeNB are simultaneously utilized. Further, a group including the N cells managed by the MeNB is referred to as a master cell group (MCG). Moreover, a group including the M cells managed by the SeNB is called a secondary cell group (SCG). Further, out of the cells managed by the SeNB, a cell having a function of receiving at least an uplink control signal (PUCCH) is referred to as a PSCell. The PSCell, which has several functions similar to the PCell, does not perform the RRC connection with the UE 100, and does not transmit an RRC message, for example. It is noted that if the predetermined frequency (carrier) in the unlicensed band is utilized as the SCell, the SCell is referred to as a U-SCell, and if the predetermined frequency is utilized as the PSCell, the SCell is referred to as a U-PSCell.

Here, it is assumed that as a mode of communication in which the unlicensed band is utilized, Licensed-Assisted Access (LAA) is utilized. In the LAA, the UE 100 communicates with a cell operated in the licensed band (hereinafter, a licensed cell) and a cell operated in the unlicensed band (hereinafter, an unlicensed cell). The licensed cell may be used as the PCell and the unlicensed cell may be used as the SCell (or PSCell). If the UE 100 performs communication with the licensed cell and the unlicensed cell, the licensed cell and the unlicensed cell may be managed by one node (for example, the eNB 200). It is noted that if the licensed cell and the unlicensed cell are managed (controlled) by one eNB 200, the unlicensed cell (and the licensed cell) may be formed by an RRH (Remote Radio Head) having a radio transceiver. Alternatively, the licensed cell may be managed by the eNB 200 and the unlicensed cell may be managed by a radio communication device different from the eNB 200. The eNB 200 and the radio communication device may exchange various information described later via a predetermined interface (X2 interface or S1 interface). The eNB 200 managing the licensed cell may notify the radio communication device of information obtained from the UE 100, or may notify the UE 100 of information obtained from the radio communication device.

In the unlicensed band, in order to avoid interference with a system (such as wireless LAN) different from an LTE system or an LTE system of another operator, it is required to execute a CCA (Clear Channel Assessment) (so called LBT (Listen Before Talk)) before a radio signal is transmitted. Specifically, in the CCA, in order to confirm whether or not the frequency (carrier) in the unlicensed band is available, the eNB 200 measures interference power. The eNB 200 allocates, based on a measurement result of the interference power, a radio resource included in the frequency (carrier) confirmed to have a clear channel, to the UE 100 (scheduling). The eNB 200 performs scheduling in the unlicensed cell via the unlicensed cell. Alternatively, the eNB 200 may perform scheduling in the unlicensed cell via the licensed cell (that is, cross-carrier scheduling).

Below, it is assumed that an operation by the eNB 200 will be described as an operation by a cell managed by the eNB 200, where necessary. Further, it should be noted that while a case where one eNB 200 performs communication with the UE 100 at a frequency in the licensed band (licensed cell) and at a frequency in the unlicensed band (unlicensed cell) will be mainly described below; this is not limiting.

Operation According to First Embodiment

Figure 6:
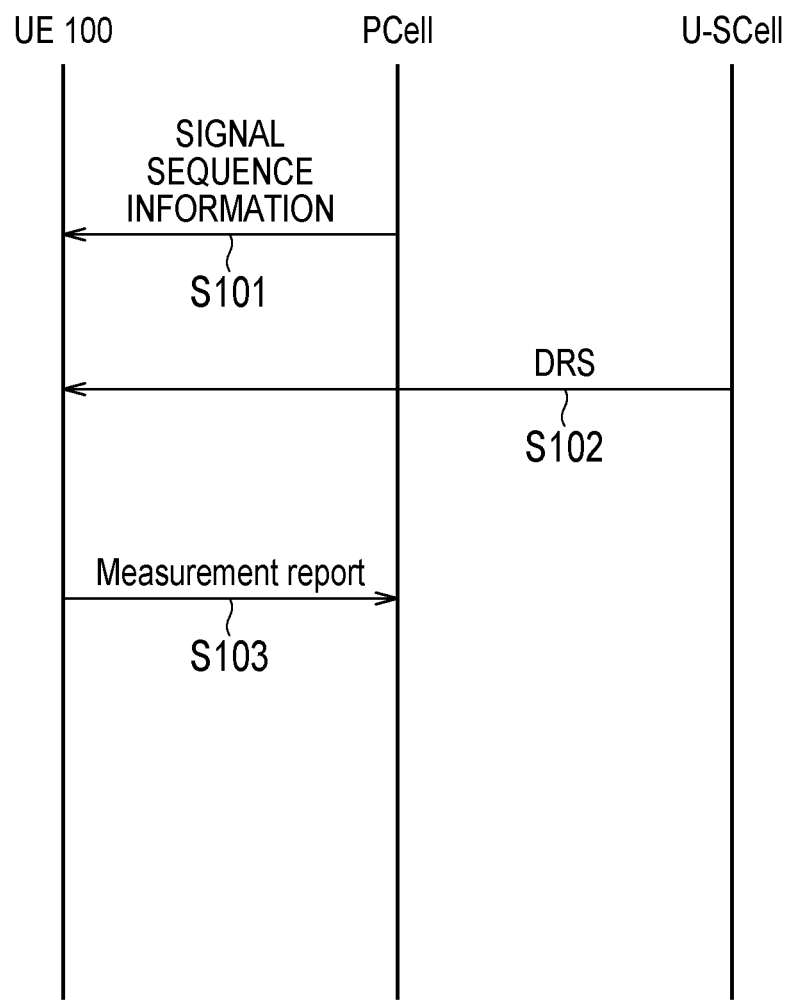
FIG. 6 is a diagram for describing an operation according to a first embodiment.

Next, an operation according to a first embodiment will be described with reference to FIG. 6. FIG. 6 is a diagram for describing the operation according to the first embodiment.

In FIG. 6, the UE 100 exists in a PCell (licensed cell) managed by the eNB 200. The UE 100 may be in an RRC idle state, or may be in an RRC connected state. In an initial state of FIG. 6, the UE 100 has not started communication with a U-SCell (unlicensed cell) managed by the eNB 200. Alternatively, the UE 100 may perform communication with a U-SCel.

As illustrated in FIG. 6, in step S101, the PCell (eNB 200) transmits signal sequence information. The signal sequence information may be transmitted by a common signal (SIB, PDCCH, for example), or may be transmitted by an individual signal (PDSCH, for example). The UE 100 stores the received signal sequence information into the memory 150.

The signal sequence information is information for identifying a signal sequence related to a reference signal transmitted from the U-SCell (eNB 200). The reference signal is a discovery reference signal (DRS), for example. The DRS includes at least any one of a synchronization signal (primary synchronization signal (PSS) and/or secondary synchronization signal (SSS)), a cell reference signal, a channel state information reference signal (CSI-RS), and a demodulation reference signal (DL-DMRS) in the downlink. Therefore, the DRS is utilized for at least any one of identification of a cell, synchronization, or observation of a channel state.

Further, the signal sequence information is a subframe number, a cell identifier (Cell ID), a CSI identifier (CSI ID), and the like. The UE 100 calculates a signal sequence of a reference signal transmitted from the U-SCell, based on the signal sequence information.

In step S102, the U-SCell (eNB 200) transmits the reference signal (DRS). The reference signal is transmitted by using a specific frequency (carrier) in which the U-SCell is operated. Here, the eNB 200 measures interference power at the specific frequency, before the reference signal is transmitted.

It is noted that, the eNB 200 is set to periodically (for example, at intervals of Xms) transmit the reference signal. However, if the interference power exceeds a threshold value (if interference is detected) as a result of measuring the interference power at a predetermined frequency in the unlicensed band, the eNB 200 cancels the transmission of the radio signal. Therefore, there may be a period during which the eNB 200 cannot transmit the radio signal according to the setting.

Hereinafter, description proceeds on the assumption that the interference power is less than a threshold value.

The UE 100 performs measurement on the radio signal in the unlicensed band. The UE 100 may receive information on a transmission timing of the DRS from the PCell and/or information indicating the specific frequency at which the U-SCell is operated, and perform the measurement on the basis of the information.

Here, the UE 100 confirms whether the obtained measurement result is a measurement result for the DRS. First, the UE 100 calculates the signal sequence of a radio signal received during the measurement, and evaluates a correlation value between the signal sequence and the signal sequence calculated based on the signal sequence information. Next, the UE 100 determines whether or not the evaluated correlation value is less than a threshold value. If the correlation value is less than the threshold value, the UE 100 determines that the radio signal received during the measurement is not a reference signal transmitted from the U-SCell. In this case, the UE 100 identifies the measurement timing as a timing at which the reference signal is not transmitted. On the other hand, if the correlation value is equal to or more than the threshold value, the UE 100 determines that the received radio signal is the reference signal transmitted from the U-SCell. In this case, the UE 100 identifies the measurement timing as a timing at which the reference signal is transmitted. It is noted that the threshold value may be retained beforehand by the UE 100, or may be provided from the eNB 200.

If the measurement timing is identified as the timing at which the reference signal is not transmitted, the UE 100 need not store the measurement result. Consequently, it is possible to exclude, from measurement results to be reported, the measurement result corresponding to the timing at which the reference signal is not transmitted. Alternatively, the UE 100 stores the measurement value and a measurement time of the radio signal in an associated manner, the UE 100 may perform the above-described determination before reporting the measurement result, and exclude, from the measurement results to be reported, the measurement result corresponding to the timing at which the reference signal is not transmitted.

In step S103, the UE 100 transmits, to the PCell, the measurement result of the radio signal in the unlicensed band. The measurement result may be a result related to a reception level (RSRP/RSRQ), or a result related to a channel state (specifically, CSI, PMI, RI, and the like).

The UE 100 excludes, from the measurement results to be reported, the measurement result corresponding to the timing at which the reference signal is not transmitted, and hence, the measurement result does not include the measurement result measured at the timing at which the reference signal is not transmitted. For this reason, the eNB 200 (PCell) can appropriately determine, based on the measurement result, the communication with the UE 100 in the unlicensed band. For example, the eNB 200 can determine, based on the measurement result, whether or not the communication (connection) with the PSCell is possible, or calculate the communication quality in the PSCell.

Second Embodiment

Figure 7:
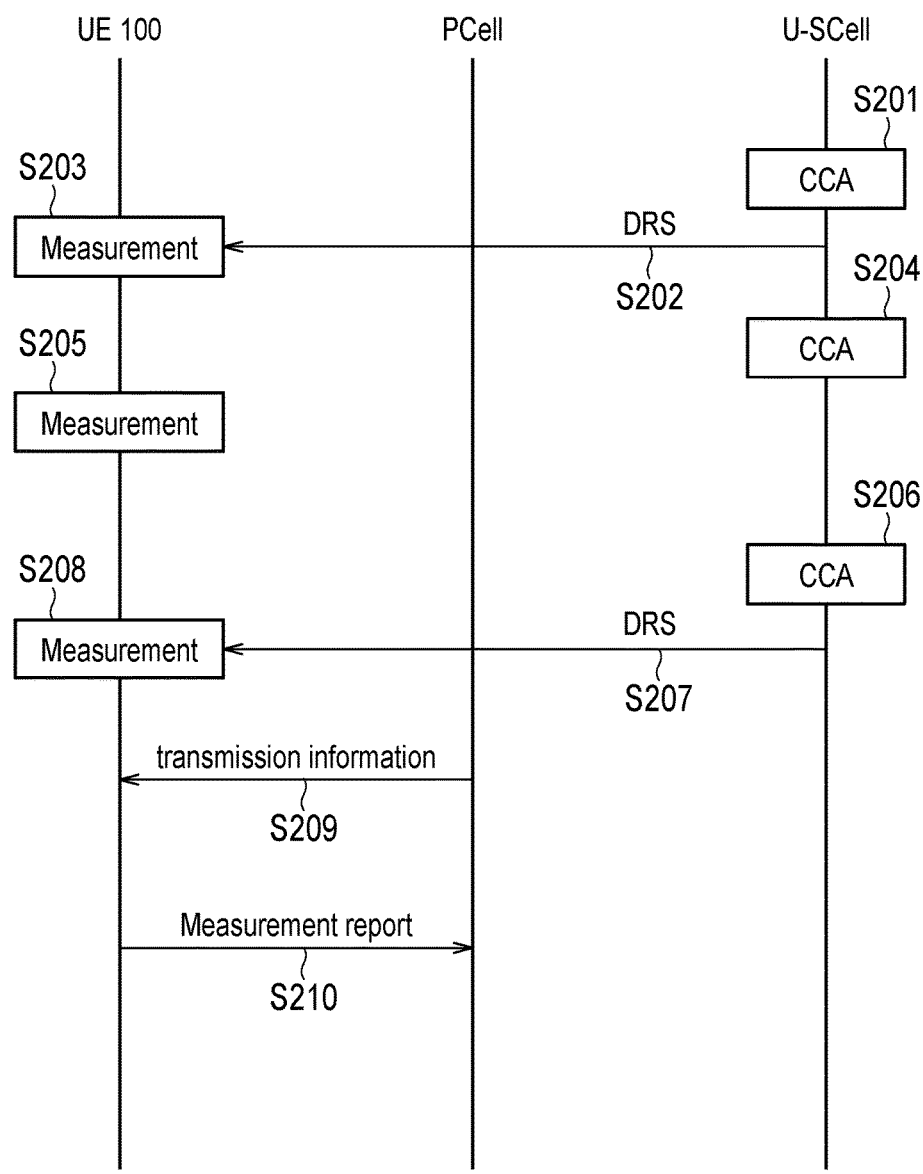
FIG. 7 is a diagram for describing an operation according to a second embodiment.

Next, an operation according to a second embodiment will be described with reference to FIG. 7. FIG. 7 is a diagram for describing the operation according to the second embodiment. Description of similar portions to the above-described embodiments will be omitted where appropriate.

In the second embodiment, the UE 100 excludes, from measurement results to be reported, a measurement result corresponding to a timing at which a reference signal is not transmitted, based on information received form the eNB 200.

As illustrated in FIG. 7, in step S201, the U-SCell (eNB 200) performs measurement (CCA) of interference power at a specific frequency in which the U-SCell is operated. In this case, description proceeds on the assumption that the interference power is less than a threshold value.

In step S202, the U-SCell transmits the DRS at the specific frequency.

In step S203, the UE 100 performs measurement on the radio signal at the specific frequency. The UE 100 stores a measurement result (first measurement result). The measurement result is stored in association with the measurement time.

In step S204, the U-SCell measures the interference power, after a predetermined time elapses since the CCA was performed in step S201. Here, description proceeds on the assumption that the interference power is equal to or more than a threshold value. In this case, the U-SCell cancels the transmission of the DRS.

In step S205, the UE 100 performs measurement on the radio signal at the specific frequency, and stores a measurement result (second measurement result).

In step S206, the U-SCell measures the interference power, after a predetermined time elapses since the CCA was performed in step S204. In this case, description proceeds on the assumption that the interference power is less than a threshold value.

In step S207, the U-SCell transmits the DRS at the specific frequency.

In step S208, the UE 100 performs measurement on the radio signal at the specific frequency, and stores a measurement result (third measurement result).

In step S209, the PCell transmits transmission information on the timing at which the reference signal is transmitted. The UE 100 receives the transmission information. The transmission information may be transmitted by a common signal (SIB, PDCCH, for example), or may be transmitted by an individual signal (PDSCH, for example).

The transmission information may be information indicating the timing at which the reference signal is transmitted, or may be information indicating the timing at which the reference signal is not transmitted. For example, the transmission information may be a list of subframe numbers. Further, the transmission information may be included in a message requesting a deletion of the measurement result corresponding to the timing at which the reference signal is not transmitted.

The eNB 200 stores at least one of the timing at which the reference signal is transmitted, and the timing at which the reference signal is not transmitted. It is noted that, the timing at which the reference signal is not transmitted may be a timing at which the transmission of the reference signal is scheduled, as well as a timing at which the reference signal cannot be transmitted based on the measurement result of interference power.

On the other hand, the UE 100 identifies the timing at which the reference signal is not transmitted, based on the transmission information. The UE 100 excludes, from the measurement results to be reported, the measurement result corresponding to the identified timing. In the present embodiment, it is assumed that the transmission information indicates a timing at which the transmission of the reference signal after step S204 is scheduled. The UE 100 excludes, from the measurement results to be reported, the second measurement result corresponding to the timing indicated by the transmission information.

The UE 100 may perform an operation of excluding the measurement result from the measurement results to be reported, by using, as a trigger, the reception of the transmission information, or may perform an operation of excluding the measurement result from the measurement results to be reported, by using, as a trigger, start of the operation of reporting the measurement result.

In step S210, the UE 100 transmits the measurement result to the PCell. The measurement result includes the first measurement result and the third measurement result, and does not include the second measurement result that is not the measurement result for the reference signal. Consequently, the eNB 200 can obtain an appropriate measurement result. Therefore, the eNB 200 can appropriately determine, based on the measurement result, the communication in the unlicensed band.

It is noted that, in the present embodiment, the transmission information indicates a plurality of timings related to the reference signal; however, this is not limiting. The transmission information may be transmitted to the UE 100 each time the DRS is not transmitted or may be transmitted to the UE 100 each time the DRS is transmitted.

Third Embodiment

Figure 8A:
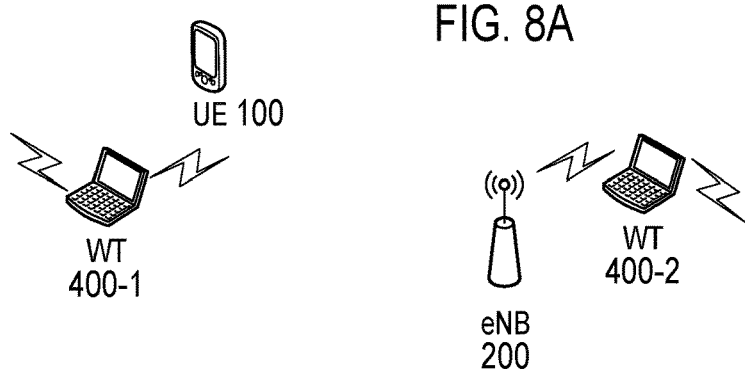
FIGS. 8A and 8B are diagrams for describing an operation according to a third embodiment.
Figure 8B:
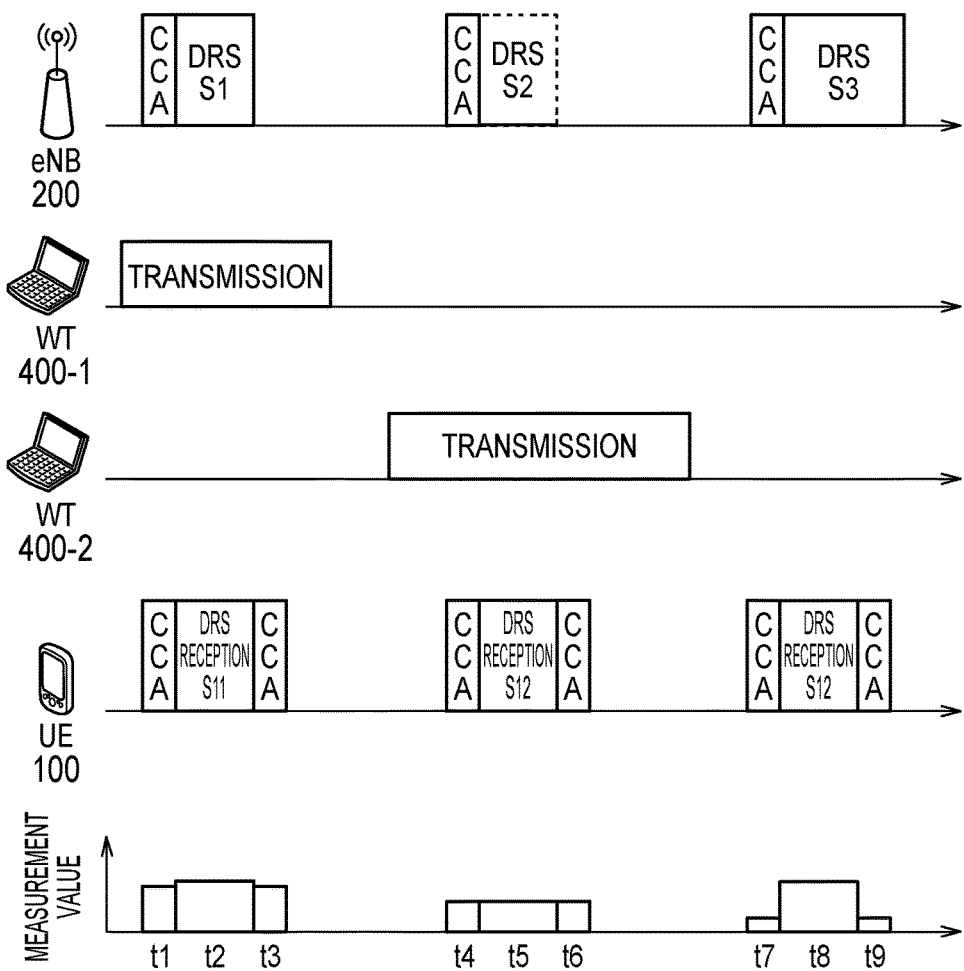

Next, an operation according to a third embodiment will be described with reference to FIGS. 8A and 8B. FIGS. 8A and 8B are diagrams for describing the operation according to the third embodiment. Description of similar portions to each of the above-described embodiments will be omitted where appropriate.

In the third embodiment, the UE 100 excludes, from measurement results to be reported, a measurement result corresponding to a timing at which a reference signal is not transmitted, based on a measurement result of interference power.

As illustrated in FIG. 8A, a first radio communication device (WT 400-1) is present in the vicinity of the UE 100, and a second radio communication device (WT 400-2) is present in the vicinity of the eNB 200. The WT 400-1 and the WT 400-2 transmit a radio signal at a specific frequency in an unlicensed band (see FIG. 8B).

Further, the eNB 200 transmits setting information on the scheduled transmission timing of a reference signal. The UE 100 receives the setting information on the scheduled transmission timing of the reference signal. The setting information may be information for specifying a timing of measurement on the reference signal at the specific frequency. The setting information may be transmitted by a common signal (SIB, PDCCH, for example), or may be transmitted by an individual signal (PDSCH, for example). The UE 100 performs, based on the setting information, measurement on the reference signal at the specific frequency at the scheduled transmission timing on the reference signal.

Further, the UE 100 measures interference power (executes the CCA) at the specific frequency, at a timing different from the scheduled transmission timing of the reference signal. The different timing is at least one of the timings before and after the scheduled transmission timing. The different timing may be a timing, which is a predetermined time earlier than the timing of performing the measurement on the reference signal, and/or may be a timing, which is a predetermined time thereafter. The different timing may be the same timing as the timing at which the eNB 200 measures the interference power. In the present embodiment, the UE 100 measures the interference power at a timing before and after the scheduled transmission timing (see FIG. 8B).

As illustrated in FIG. 8B, from t1 to t3, the WT 400-1 is transmitting a radio signal at a specific frequency. From t4 to t6, the WT 400-2 is transmitting a radio signal at a specific frequency.

At t1, the eNB 200 and the UE 100 measures interference power. The eNB 200 is far from the WT 400-1, and hence, the interference power in the eNB 200 is less than a threshold value. As a result, the eNB 200 determines to transmit a reference signal at t2.

At t2, the eNB 200 transmits the reference signal at the specific frequency. The UE 100 performs measurement at the specific frequency.

At t3, the UE 100 measures interference power.

At t4, the eNB 200 and the UE 100 measure interference power. The eNB 200 is close to the WT 400-2, and hence, the interference power in the eNB 200 is equal to or more than the threshold value. As a result, the eNB 200 determines not to transmit the reference signal at t5.

At t5, the eNB 200 does not transmit the reference signal, however, the UE 100 performs measurement at the specific frequency.

At t6, the UE 100 performs measurement at the specific frequency.

From t7 to t9, the eNB 200 and the UE 100 operate similarly to from t1 to t3.

A CCA result in FIG. 8B indicates a measurement result (measurement value: reception level) in the UE 100.

Next, based on the measurement results at the different timings (specifically, t1, t3, t4, t6, t7, t9) and the measurement results at the scheduled transmission timings (specifically, t2, t5, t8), the UE 100 identifies a timing at which the reference signal is not transmitted.

The reception level at t2 is higher than the reception level at t1 (t3) by a predetermined value or more (that is, reception level at t2−reception level at t1 (t3)>predetermined value), and hence, the UE 100 estimates that the eNB 200 has transmitted the reference signal. Therefore, the UE 100 identifies the timing of t2 as the timing at which the reference signal is transmitted.

Further, the reception level at t5 is not higher than the reception level at t4 (t6) by a predetermined value or more (that is, reception level at t5−reception level at t4 (t6) <predetermined value), and hence, the UE 100 estimates that the eNB 200 has not transmitted the reference signal. Therefore, the UE 100 identifies the timing of t5 as a timing at which the reference signal is not transmitted.

Further, the reception level at t8 is higher than the reception level at t7 (t9) by a predetermined value or more (that is, reception level at t8−reception level at t7 (t9) >predetermined value), and hence, the UE 100 estimates that the eNB 200 has transmitted the reference signal. Therefore, the UE 100 identifies the timing of t8 as a timing at which the reference signal is transmitted.

From the above, the UE 100 excludes the measurement result at t5 from the measurement results to be reported, and reports the measurement results at t2 and t8 to the eNB 200. Therefore, the eNB 200 can appropriately determine, based on the measurement result, the communication in the unlicensed band.

Fourth Embodiment

Operation According to Fourth Embodiment

Figure 9:
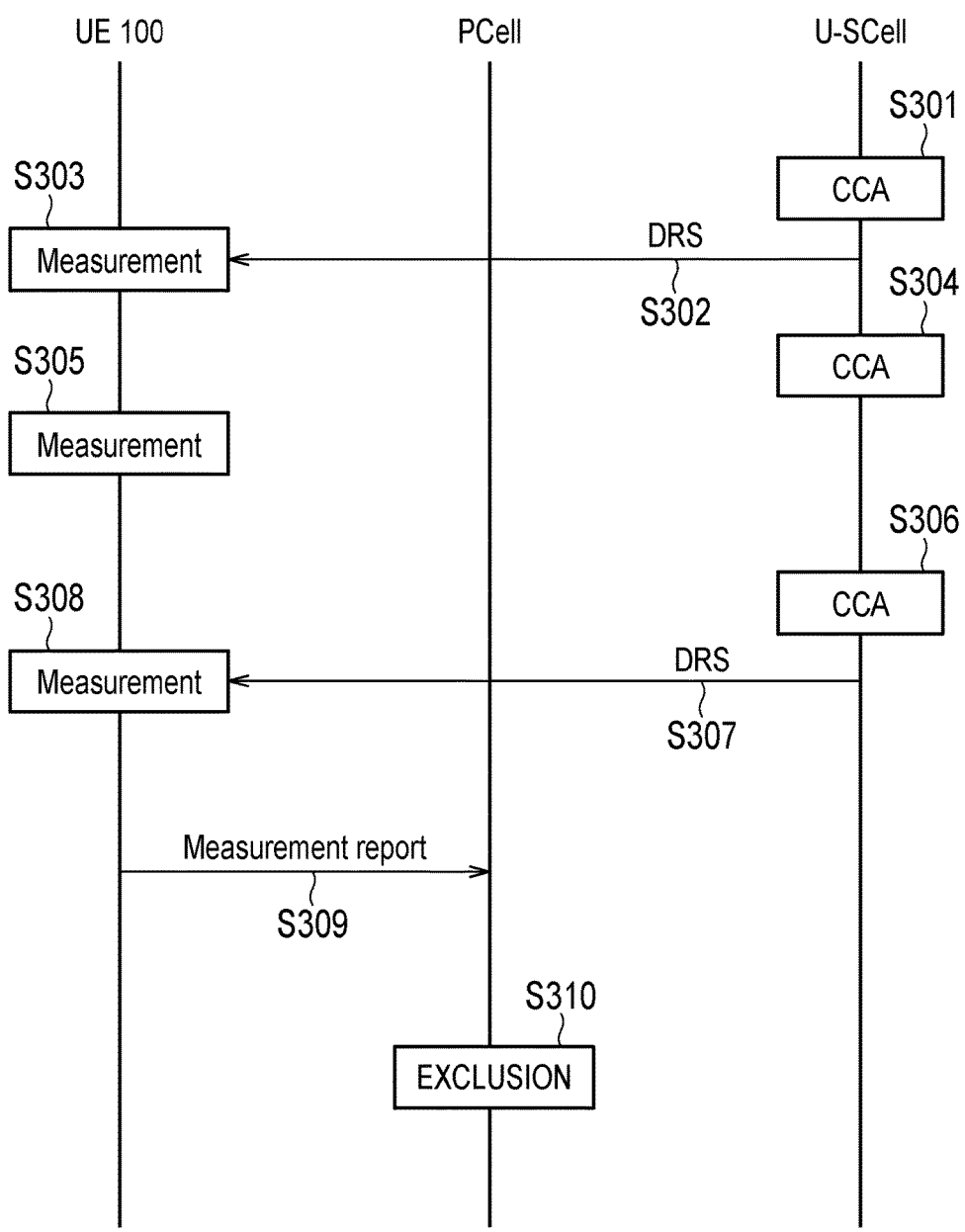
FIG. 9 is a diagram for describing an operation according to a fourth embodiment.

Next, an operation according to a fourth embodiment will be described with reference to FIG. 9. FIG. 9 is a diagram for describing the operation according to the fourth embodiment. Description of similar portions to each of the above-described embodiments will be omitted where appropriate.

In the fourth embodiment, the eNB 200 excludes a measurement result, based on a transmission record of a reference signal.

An operation environment in FIG. 9 is similar to the operation environment in the second embodiment (FIG. 7).

Steps S301 to S308 correspond to steps S201 to S208.

In step S309, the UE 100 transmits the measurement result to the PCell. The measurement result here includes not only the first measurement result and the third measurement result, but also the second measurement result.

Here, in the present embodiment, the eNB 200 stores, in much the same way as in the second embodiment, at least one of a timing at which the reference signal is transmitted and a timing at which the reference signal is not transmitted. Specifically, the eNB 200 retains a transmission record related to a timing at which the reference signal is not transmitted. Specifically, the eNB 200 keeps, in the transmission record, at least one of a timing at which the reference signal is transmitted and a timing at which the reference signal is not transmitted. In the present embodiment, the eNB 200 keeps, in the transmission record, a timing at which the reference signal is not transmitted based on the measurement result of step S304.

In step S310, the PCell (eNB 200) excludes, from the measurement result reported from the UE 100, the measurement result corresponding to the timing at which the reference signal is not transmitted. In the present embodiment, the eNB 200 excludes the second measurement result corresponding to the timing at which the transmission of the reference signal after step S304 is scheduled. Consequently, the eNB 200 can obtain an appropriate measurement result.

Modification of Fourth Embodiment

Figure 10A:
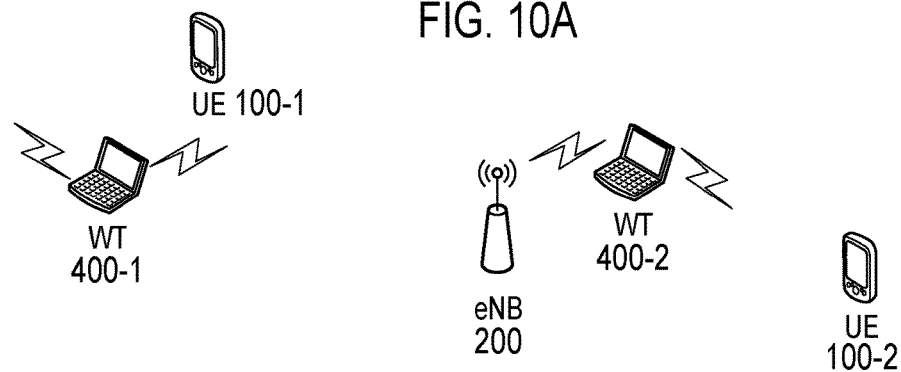
FIGS. 10A and 10B are diagrams for describing an operation according to a modification of the fourth embodiment.
Figure 10B:
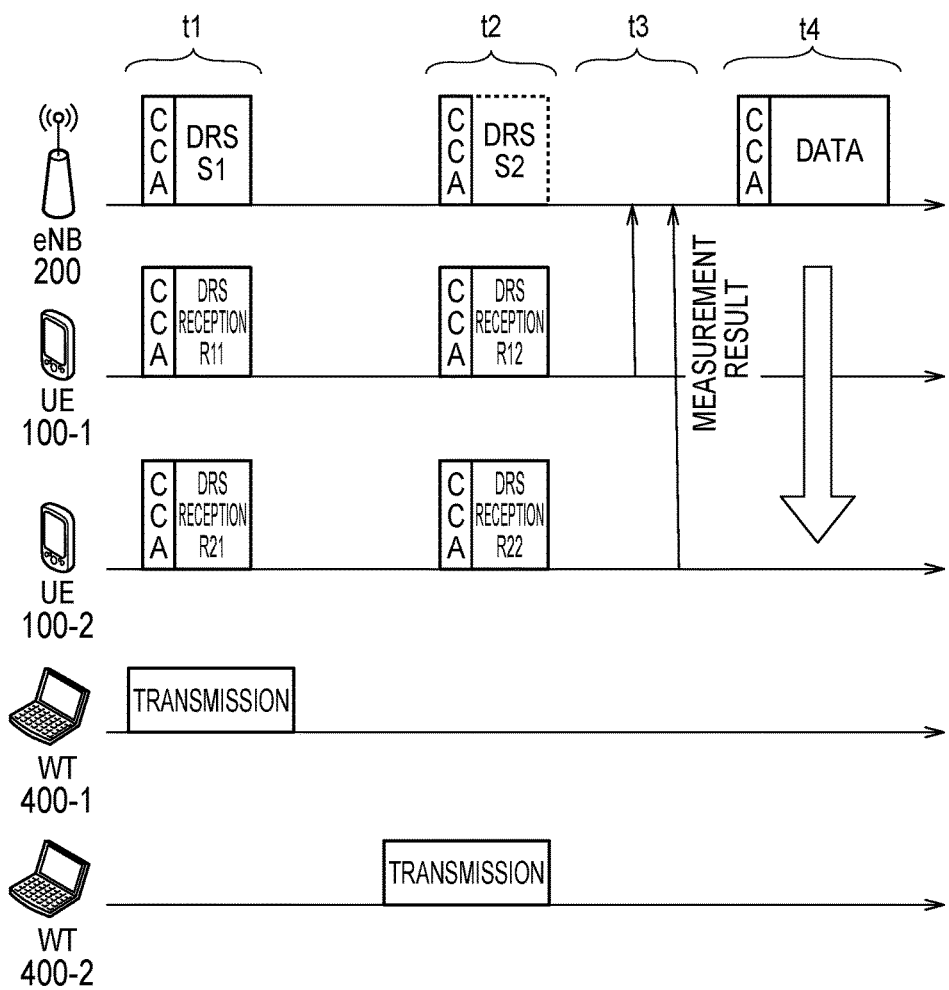

Next, an operation according to a modification of the fourth embodiment will be described with reference to FIGS. 10A and 10B. FIGS. 10A and 10B are diagrams for describing the operation according to the modification of the fourth embodiment. Description of similar portions to each of the above-described embodiments will be omitted where appropriate.

In the modification of the fourth embodiment, the UE 100 reports, to the eNB 200, not only the measurement result for the reference signal, but also the measurement result of the interference power. The eNB 200 determines, based on the measurement result of the interference power, MCS (transmission rate, error tolerance) of data to be transmitted to the UE 100.

As illustrated in FIG. 10A, the first radio communication device (WT 400-1) is present in the vicinity of the UE 100-1, and the second radio communication device (WT 400-2) is present in the vicinity of the UE 100-2 and the eNB 200. The WT 400-1 and the WT 400-2 transmit a reference signal at the specific frequency in the unlicensed band (see FIG. 10B).

Further, the eNB 200 transmits first setting information on a scheduled transmission timing of the reference signal. Each of UEs 100 (the UE 100-1 and the UE 100-2) receives the setting information on the scheduled transmission timing of the reference signal. Each of UEs 100 measures, based on the first setting information, the reference signal at a specific frequency at the scheduled transmission timing of the reference signal.

Further, the eNB 200 transmits, to each UE 100, second setting information for ensuring that each UE 100 executes measurement of the interference power. This second setting information includes information for ensuring that the UE 100 executes, at the same timing as the eNB 200, measurement of the interference power at the specific frequency within the unlicensed band. Each UE 100 measures the interference power at the same timing as the eNB 200, based on the second setting information. It is noted that, even if the second setting information is not received, each UE 100 may estimate, based on the first setting information, a timing at which the eNB 200 measures the interference power.

As illustrated in FIG. 10B, at t1, the WT 400-1 is transmitting a radio signal at a specific frequency. At t2, the WT 400-2 is transmitting a radio signal at a specific frequency.

At t1, the eNB 200 and each UE 100 measure interference power at the same timing. The eNB 200 is far from the WT 400-1, and hence, the interference power in the eNB 200 is less than a threshold value. As a result, the eNB 200 determines to transmit a reference signal.

Next, the eNB 200 transmits the reference signal at the specific frequency. Each UE 100 performs measurement at the specific frequency. A measurement result of the UE 100-1 is a measurement result in which interference is received from the WT 400-1.

At t2, the eNB 200 and the UE 100 measure interference power at the same timing. The eNB 200 is close to the WT 400-2, and hence, the interference power in the eNB 200 is equal to or more than the threshold value. As a result, the eNB 200 determines not to transmit the reference signal. The eNB 200 does not transmit the reference signal, however, each UE 100 performs measurement at the specific frequency. A measurement result of the UE 100-2 is a measurement result in which interference is received from the WT 400-2.

At t3, each UE 100 reports, to the eNB 200, not only the measurement result for the reference signal (DRS result), but also the measurement result of the interference power (CCA result). The eNB 200 receives (obtains) the first measurement result and the second measurement result.

At t4, the eNB 200 measures interference power. The interference power in the eNB 200 is less than a threshold value. As a result, the eNB 200 determines that the interference is not received in the eNB 200, similarly to t1. The eNB 200 determines to transmit data to the UE 100.

If the DRS result from the UE 100 is greater than a first threshold value, the eNB 200 determines that an interference source is present near the UE 100 from which the DRS result is transmitted. As a result, the eNB 200 increases error tolerance of data to be transmitted to the UE 100. The first threshold value may be a threshold value used by the eNB 200 for detecting interference, or may be a threshold value corresponding to transmission power of the reference signal (DRS) transmitted by the eNB 200.

On the other hand, if the CCA result from the UE 100 is smaller than a second threshold value (a threshold value lower than the first threshold value, for example), the eNB 200 determines that an interference source is not present near the UE 100 from which the first measurement result is transmitted. As a result, the eNB 200 decreases the error tolerance of data to be transmitted to the UE 100.

Further, the eNB 200 can compare the CCA result in the eNB 200 immediately before transmitting the data with the past CCA result in the eNB 200 (for example, the CCA result immediately before transmitting the reference signal) to determine the error tolerance of the data to be transmitted. The eNB 200 determines the error tolerance (MCS) as follows, for example.

The eNB 200 determines that the UE 100-1 has received interference at t1, based on the CCA result from the UE 100-1. Further, at t1, although the eNB 200 does not receive the interference, the UE 100-1 receives the interference. For this reason, the eNB 200 determines that the UE 100-1 is likely to receive interference at t4, although the eNB 200 does not receive the interference at t4. Therefore, the eNB 200 determines the MCS for the data to be transmitted to the UE 100-1 to be the MCS having a high error tolerance, based on the DRS result at t1 from the UE 100-1.

Alternatively, the eNB 200 determines the error tolerance, based on the CCA result (or the DRS result) that the UE 100-1 does not receive interference. Here, at t2, the eNB 200 does not transmit the reference signal (DRS). For this reason, the eNB 200 usually does not determine the error tolerance (MCS) on the basis of the DRS result at t2 from the UE 100-1. On the other hand, from the CCA result from the UE 100-1, the eNB 200 knows that the UE 100-1 does not receive interference when the eNB 200 is receiving interference.

On the other hand, from the CCA result at t1, the eNB 200 determines, at t1, that the UE 100-2, similarly to the eNB 200, does not receive interference. For this reason, the eNB 200 does not receive interference at t4, and hence, the eNB 200 determines that the UE 100-2 is less likely to receive interference at t4. Consequently, the eNB 200 determines the MCS for the data to be transmitted to the UE 100-2 to be the MCS having a high transmission rate (MCS having a low error tolerance), based on the DRS result at t1.

In this case, if transmitting data only to one of the UE 100-1 and the UE 100-2 at t4, for example, the eNB 200 can determine to (preferentially) transmit data to the UE 100-2 which is less likely to receive interference.

It is noted that a case where in the eNB 200, the CCA result at t4 is greater than the CCA result at t1 and smaller than the CCA result at t2 (t2 result>t4 result>t1 result) is provisionally assumed. In this case, the eNB 200 determines, based on the CCA result from the UE 100-2, that the UE 100-2, similarly to the eNB 200, receives interference. Therefore, the eNB 200 determines that the UE 100-2 is highly likely to receive interference at t4, based on the CCA result of the eNB 200 at t4. The eNB 200 determines the MCS applied to the data to be transmitted to the UE 100-2 at t4 to be the MCS having a high error tolerance.

On the other hand, the eNB 200 determines, based on the CCA result at t2 from the UE 100-1, that the UE 100-1, similarly to the eNB 200, does not receive interference. Therefore, the eNB 200 determines that the UE 100-1 is less likely to receive interference at t4, based on the CCA result of the eNB 200 at t4. The eNB 200 determines the MCS applied to the data to be transmitted to the UE 100-2 to be the MCS having a high transmission rate.

In this case, if transmitting data only to one of the UE 100-1 and the UE 100-2 at t4, for example, the eNB 200 can determine to (preferentially) transmit data to the UE 100-1 which is less likely to receive interference.

Thus, the eNB 200 can determine the UE 100 to which the data is transmitted, and the MCS, based on the CCA result in the eNB 200 (in particular, a CCA result immediately before the data transmission to the UE 100), and the DRS result and the CCA result of each UE 100.

Fifth Embodiment

Next, an operation according to a fifth embodiment will be described with reference to FIG. 11. FIG. 11 is a diagram for describing an operation according to the fifth embodiment. Description of similar portions to each of the above-described embodiments will be omitted where appropriate.

In the fifth embodiment, the UE 100 identifies a timing at which a reference signal is not transmitted, based on whether or not an identification message (identification information) for identifying the reference signal is detected from a received predetermined radio signal. That is, the UE 100 identifies, as the reference signal, the predetermined radio signal in which the identification message is detected.

As illustrated in FIG. 11, in a reference signal (DRS) transmitted from the eNB 200, a first field storing therein synchronization information (sync) used for synchronization with the eNB 200, a second field storing therein information about the reference signal (RS), and a third field storing therein a short control message are arranged. Therefore, the DRS includes the synchronization signal (sync), the reference signal (RS), and the short control message (SCM).

The short control message includes an identification message for specifying the reference signal (DRS). Therefore, in the reference signal, the identification message is stored in a field (third field) different from the field (first field) storing therein the synchronization information used for synchronization with the eNB 200. The identification message may be imparted with an error detection code. The error detection code is a CRC (Cyclic Redundancy Check) code used for a CRC. Alternatively, the error detection code may be a checksum.

The UE 100 attempts to detect the identification message from the received radio signal by any one of the following methods. If detecting the identification message from the received radio signal, the UE 100 identifies the radio signal as the reference signal (DRS). That is, the UE 100 considers a measurement result based on the received radio signal, as measurement results to be reported. On the other hand, if not possible to detect the identification message from the received radio signal, the UE 100 identifies, as the timing at which the reference signal is not transmitted, a measurement timing of the radio signal. That is, the UE 100 excludes from the measurement results to be reported the measurement result based on the radio signal.

It is noted that when excluding the measurement result from the measurement results to be reported, the UE 100 does not report the measurement result to the eNB 200. However, the UE 100 may notice the eNB 200 of a report indicating a failure to receive (detect) the reference signal. The UE 100 may notify, if a measurement (and a report) for a single reference signal (DRS) is instructed explicitly or implicitly from the eNB 200, the eNB 200 of a report indicating a failure to receive the reference signal. Further, the UE 100 needs not to perform, if reporting to the eNB 200 an average value (moving average value) of measurement results calculated based on a plurality of reference signals (DRSs), a process of a moving average, on the measurement result excluded from the measurement results to be reported. The UE 100 needs not to perform, also if performing a process other than the moving average on the measurement result, the process on the measurement result excluded from the measurement results to be reported. Further, the UE 100 needs not to perform, if instructed by the eNB 200 to report, to the eNB 200, an average value of the measurement results calculated based on the plurality of reference signals (DRSs), the process of a moving average, on the measurement result excluded from the measurement results to be reported. Alternatively, the UE 100 needs not to perform, if voluntarily reporting to the eNB 200 rather than being instructed by the eNB 200, the process of a moving average on the measurement result excluded from the measurement results to be reported.

Alternatively, the UE 100 needs not to measure or calculate, if the received radio signal cannot be identified as the reference signal, a received strength (RSRP) and/or a reception quality (RSRQ) of the radio signal. Alternatively, if the received radio signal cannot be identified as the reference signal, the UE 100 needs not to store the measurement result (or a calculation result corresponding to the measurement result) for the radio signal after measuring or calculating the received strength (RSRP) and/or the reception quality (RSRQ) of the radio signal. That is, the UE 100 needs not to record the measurement result for the radio signal as a log. Alternatively, if the received radio signal cannot be identified as the reference signal, the UE 100 needs not to report, after recording the measurement result for the radio signal, the measurement result. It is noted that such an operation of the UE 100 may be implemented not only in the fifth embodiment but also in other embodiments.

Firstly, the UE 100 identifies, if detecting, from the received radio signal, the identification message based on an identifier associated with the eNB 200, the received radio signal as the reference signal.

Then, the eNB 200 includes the identification message based on the identifier associated with the eNB 200, into the short control message.

The identifier associated with the eNB 200 is a cell identifier (PCI: Physical Cell Identifier) indicating the unlicensed cell that is a cell in the unlicensed band. Alternatively, an identifier (Public Land Mobile Network (PLMN) ID) indicating a PLMN to which the eNB 200 belongs may also be possible. Alternatively, the identifier may be a cell identifier indicating the licensed cell.

The identification message may be a message associated with the identifier related to the eNB 200, and may be a message calculated based on the identifier related to the eNB 200. For example, the identification message (identification information) is any one of the following messages.

- N bits (N: positive integer: 9 bits, for example) of PCI itself
- A message (PCI+PLMN ID) obtained by linking N bits (9 bits, for example) of PCI with PLMN ID
- A message (PCI+specific bit string) obtained by linking the N bits (9 bits, for example) of PCI with a specific bit string notified from the eNB 200
- PLMN ID itself
- A message (PLMN ID+specific bit string) obtained by linking the PLMN ID with the specific bit string notified from the eNB 200
- A message obtained by applying a predetermined scramble to an upper message The eNB 200 can notify, in instructing the UE 100 to perform a cell search in the unlicensed band, for example, the UE 100 of the identifier related to the eNB 200, in the licensed band. At that time, the eNB 200 may notify the UE 100 of the specific bit string. Alternatively, the eNB 200 may notify the identifier related to the eNB 200 at another timing. The identifier related to the eNB 200 may be notified to the UE 100 by a common signal (SIB, and PDCCH, for example), or may be notified to the UE 100 by an individual signal (PDSCH, for example). Alternatively, the identifier related to the eNB 200 may be notified to the UE 100 by the synchronization signal included in the reference signal. It is noted that the specific bit string can be similarly notified.

Thereafter, the UE 100 receives the radio signal, for example, at a timing at which the transmission of the reference signal is scheduled. The UE 100 determines, if the short control message is included in the received radio signal, whether or not the message included in the short control message is the identification message based on the identifier related to the eNB 200 notified from the eNB 200. For example, the UE 100 determines, based on the identifier (PCI, for example) related to the eNB 200 included in the reference signal, whether or not the message included in the short control message in the reference signal is the identification message.

The UE 100 identifies, if the message is the identification message, the received radio signal as the reference signal because the identification message is detected from the received radio signal. That is, the UE 100 creates a measurement report, based on the received radio signal. On the other hand, the UE 100 excludes, when the message is not the identification message, the measurement result based on the received radio signal from the measurement results to be reported. That is, the UE 100 does not create a measurement report, based on the received radio signal.

It is noted that the identification message included in the reference signal is prescribed, and the UE 100 can determine, according to the prescription, whether or not the message included in the short control message is the identification message based on the identifier related to the eNB 200. If the identification message included in the reference signal is not uniquely prescribed, the following methods may be used.

Secondly, the UE 100 identifies, if detecting, from the received radio signal, the identification message corresponding to the message received from the eNB 200, the received radio signal as the reference signal.

The eNB 200 separately notifies the UE 100 of the identification message included in the reference signal. The eNB 200 preferably notifies the UE 100 of the identification message in the licensed band. The identification message may be notified to the UE 100 by a common signal (SIB, and PDCCH, for example), or may be notified to the UE 100 by an individual signal (PDSCH, for example). Alternatively, the identification message may be notified to the UE 100 by the synchronization signal included in the reference signal.

It is noted that the eNB 200 may use any bit string as the identification message. Alternatively, the eNB 200 may use the message (bit string) associated with the identifier related to the eNB 200 as the identification message.

The UE 100 receives the radio signal, for example, at a timing at which the transmission of the reference signal is previously scheduled. The UE 100 determines, if the short control message is included in the received radio signal, whether or not the message included in the short control message is the message corresponding to the identification message notified from the eNB 200. If the message is the identification message, the UE 100 identifies the received radio signal as the reference signal. On the other hand, the UE 100 does not create, when the message is not the identification message, the measurement report, based on the received radio signal.

It is noted that the UE 100 may hold the measurement result for the received radio signal, and if the identification message included in the reference signal is notified from the eNB 200, may exclude the measurement result from the measurement results to be reported.

Thirdly, the UE 100 identifies, if an error is not detected from the message included in the reference signal (specifically, the short control message), the received radio signal as the reference signal. It is noted that a case where the error detection code is a CRC code, below will be described, but another error detection code may be used.

The eNB 200 includes the identification message to which the CRC code that is the error detection code is imparted, into the short control message. The eNB 200 transmits the reference signal including therein the short control message.

The UE 100 receives the radio signal, for example, at a timing at which the transmission of the reference signal is previously scheduled. The UE 100 performs, if the short control message is included in the received radio signal, the CRC (Cyclic Redundancy Check) on the message included in the short control message. The UE 100 performs the CRC by using a previously defined CRC bit number or a polynomial, for example. As a result of the CRC, if the error is not detected from the message, the UE 100 detects, as the identification message, the message from the received radio signal. Here, by using the above-described methods, it may be determined whether or not the message in which no error is detected is the identification message (specifically, the identification message based on the identifier related to the eNB 200 or the identification message notified from the eNB 200). On the other hand, as a result of the CRC, if an error is detected from the message, the UE 100 determines that the received radio signal is not the reference signal. Alternatively, the UE 100 determines that the received radio signal is not an effective reference signal. That is, the UE 100 does not create, when an error is detected from the message, the measurement report, based on the received radio signal.

Thus, the UE 100 can designate, based on whether or not the identification message is detected from the received radio signal, the timing at which the reference signal is not transmitted, and thus, the UE 100 can obtain an appropriate measurement result by implementing an appropriate measurement (RRM measurement) on the reference signal.

It is noted that the UE 100 may perform the measurement on the received radio signal or create the measurement report therefor, and thereafter, use the above-described methods to determine whether or not to exclude the measurement result from the measurement results to be reported.

It is noted that the identification message may be stored in the field (third field) different from the field (first field) storing therein the synchronization information used for synchronization with the eNB 200. Here, the identification message stored in the third field, which is different from the existing synchronization information, may be imparted with the error detection code. That is, the identification message (PCI, for example) is a message in which an error can be detected, and thus, the UE 100 can highly reliably detect the identification message. As a result, the UE 100 can highly reliably determine whether or not the received radio signal is the reference signal. Therefore, the UE 100 (and the eNB 200) can obtain a more appropriate measurement result.

Sixth Embodiment

Next, an operation according to a sixth embodiment will be described. Description of similar portions to each of the above-described embodiments will be omitted where appropriate.

In the sixth embodiment, the eNB 200 transmits, in the same manner as in the fifth embodiment, the reference signal including the identification message. However, the UE 100 does not exclude the measurement result, but the eNB 200 excludes the measurement result.

In the sixth embodiment, the eNB 200 transmits the reference signal including the identification message as described in the fifth embodiment. It is noted that the identification message is stored in the third field different from the field storing therein the synchronization information. Similarly to the above-described fifth embodiment, the identification message may be imparted with the error detection code. That is, the message stored in the third field may be imparted with the error detection code.

Further, the eNB 200 needs not to notify the UE 100 of information (specifically, the identifier related to the eNB 200, the identification message itself, or the like) about the identification message included in the reference signal.

On the other hand, the UE 100 attempts to detect a message from the received radio signal. The UE 100 reports, if having successfully detected a message included in the short control message in the reference signal, the measurement result for the radio signal including therein the detected message, to the eNB 200. It is noted that the UE 100 may report a single measurement result, and may report a plurality of measurement results all together.

Here, unlike the fifth embodiment, irrespective of the detected message being the identification message, the UE 100 reports the measurement result for the radio signal including the detected message, to the eNB 200. That is, the UE 100 can report the measurement result to the eNB 200 without determining whether or not the detected message is the identification message. Therefore, the detected message may not be a message based on the identifier related to the eNB 200 configured to manage the cell in which the UE 100 exists, but be a message based on an identifier related to another eNB 200.

The UE 100 stores the detected message and the measurement result in an associated manner. The UE 100 reports the measurement result associated with the detected message, to the eNB 200. The eNB 200 receives the measurement result associated with the message detected by the UE 100 (hereinafter, "predetermined message").

The eNB 200 holds, if the predetermined message associated with the measurement result matches the identification message included in the reference signal, the measurement result associated with the message. The eNB 200 determines, based on the measurement result, whether or not the communication (connection) with the unlicensed cell is possible, or calculates the communication quality in the unlicensed cell.

On the other hand, the eNB 200 determines, if the predetermined message associated with the measurement result does not match the identification message included in the reference signal, that the measurement result is not the measurement result for the reference signal transmitted by the eNB 200. Alternatively, the eNB 200 also determines, if the measurement result for the reference signal in the unlicensed band is not associated with the predetermined message, that the measurement result is not the measurement result for the reference signal transmitted by the eNB 200. In this case, the eNB 200 does not utilize the measurement result from the UE 100 but excludes the same. Consequently, the eNB 200 can obtain an appropriate measurement result.

Other Embodiments

In each of the above described embodiments, a case where the UE 100 reports a measurement result to the eNB 200 is described; however, this is not limiting. The UE 100 may make a predetermined determination, based on a measurement result with a high efficacy from which the measurement result corresponding to a timing at which the reference signal is not transmitted from the eNB 200 is excluded. For example, the UE 100 can make a determination about a communication environment in the unlicensed cell, based on the measurement result with a high efficacy.

It is noted that in each of the aforementioned embodiments, it is needless to say that the synchronization signal (first field storing therein the above-described synchronization information) may not include the identification message.

In the above-described embodiment, the LTE system is described as an example of the mobile communication system; however the LTE system is not an exclusive example, and the disclosure of the present application may be applied to a system other than the LTE system.

The invention claimed is:
1. A user terminal, comprising:
   a controller; and
   a transmitter, wherein
   the controller is configured to
      receive a predetermined radio signal in a secondary cell in an unlicensed band, the secondary cell being managed by a serving base station of the user terminal; and
      determine whether or not control information is detected from the predetermined radio signal, the control information being information to which a predetermined scramble is applied, and the control information being related to radio communication between the user terminal and the serving base station, and wherein
   the transmitter is configured to
      transmit a report of measurement results including a predetermined measurement result based on the predetermined radio signal, in response to determining that the control information is detected from the predetermined radio signal, and
      transmit the report of measurement results not including the predetermined measurement result, in response to determining that the control information is not detected from the predetermined radio signal.
2. The user terminal according to claim 1, wherein the control information is information imparted with a CRC (Cyclic Redundancy Check) code.
3. A processor, comprising:
   a memory communicatively coupled to the processor and including instructions, such that when executed by the processor, the processor performs the processes of:
      receiving a predetermined radio signal in a secondary cell in an unlicensed band, the secondary cell being managed by a serving base station of the user terminal;

determining whether or not control information is detected from the predetermined radio signal, the control information being information to which a predetermined scramble is applied, and the control information being related to radio communication between the user terminal and the serving base station;

transmitting a report of measurement results including a predetermined measurement result based on the predetermined radio signal, in response to determining that the control information is detected from the predetermined radio signal; and transmitting the report of measurement results not including the predetermined measurement result, in response to determining that the control information is not detected from the predetermined radio signal.

4. A mobile communication system, comprising:

a user terminal; and a serving base station of the user terminal, wherein the serving base station manages a secondary cell in an unlicensed band, the user terminal receives a predetermined radio signal in the secondary cell in the unlicensed band, the user terminal determines whether or not control information is detected from the predetermined radio signal, the control information being information to which a predetermined scramble is applied, and the control information being related to radio communication between the user terminal and the serving base station, the user terminal transmits a report of measurement results including a predetermined measurement result based on the predetermined radio signal, in response to determining that the control information is detected from the predetermined radio signal, and the user terminal transmits the report of measurement results not including the predetermined measurement result, in response to determining that the control information is not detected from the predetermined radio signal.

* * * * *